United States Patent [19]

Linnemeier

[11] Patent Number: 4,512,209
[45] Date of Patent: Apr. 23, 1985

[54] STEERING COLUMN

[75] Inventor: Elmer H. Linnemeier, Washington Depot, Conn.

[73] Assignee: The Torrington Company, Torrington, Conn.

[21] Appl. No.: 476,589

[22] Filed: Mar. 18, 1983

[51] Int. Cl.³ .............................................. B62D 1/18
[52] U.S. Cl. ...................................... 74/492; 188/378
[58] Field of Search ........................... 74/492; 188/378

[56] References Cited

U.S. PATENT DOCUMENTS

| 3,980,314 | 9/1976 | Köpf | 74/492 |
| 4,183,258 | 1/1980 | Stephan | 74/492 |
| 4,273,005 | 6/1981 | Strutt | 74/492 |
| 4,274,299 | 6/1981 | Jones | 74/492 |
| 4,296,839 | 10/1981 | Peller et al. | 188/378 |
| 4,304,147 | 12/1981 | Linnemeier et al. | 74/492 |
| 4,325,268 | 4/1982 | Benteler et al. | 74/492 |

Primary Examiner—Allan D. Herrmann
Assistant Examiner—Shirish Desai
Attorney, Agent, or Firm—F. S. Troidl

[57] ABSTRACT

A support tube, included as a part of a collapsible steering column, makes the steering column much more stable and less prone to vibration without changing or hindering the collapsing characteristics of the steering column.

4 Claims, 1 Drawing Figure

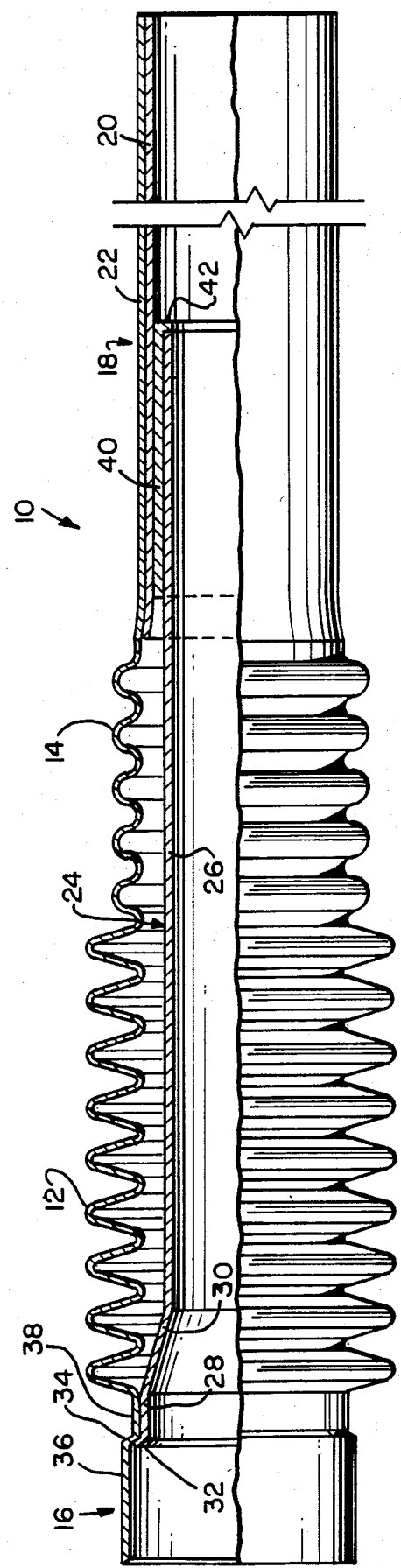

STEERING COLUMN

This invention relates to steering mechanisms for motor vehicles. More particularly, this invention is a new collapsible steering column for a steering wheel.

When an accident involving a motor vehicle occurs, people in the vehicle, especially the driver, suffer injuries often leading to death. Often greater injury or death occurs to the driver because of the great shock given to him by projecting portions of the steering wheel. The automative industry is continuously working to improve safety devices in automobiles including improved steering wheels designed to minimize the shock resulting from collisions. One type of safety device used in currently built motor vehicles includes a structure for absorbing the impact force. These structures include, for example, thin convolutions included in the steering column which collapse in the event of an accident. An example of this type safety mechanism is disclosed in U.S. Pat. No. 4,304,147, Issued Dec. 8, 1981 in the name of Linnemeier, et al and entitled STEERING COLUMN.

Collapsible motor vehicle steering columns have a tendency to vibrate. Of course, this vibration is undesirable. However, any structure included in the steering column to minimize the vibrations must be such that the collapsing characteristics of the steering column is not altered.

This invention provides the motor vehicle industry with a collapsible steering column which has the same collapsing characteristics of currently made steering columns but is much more stable than currently made steering columns. Thus, vibrations are minimized.

Briefly described, the invention comprises a steering column for a steering wheel assembly with an outer tube having energy absorbing means along a longitudinal portion thereof separating relatively non-energy absorbing upper and lower sections. A support tube is located within the outer tube. The support tube extends from the lower section, through the energy absorbing means, and into the upper section. The support tube contacts the relatively non-energy absorbing lower section. An annular noise dampener separates the relatively non-energy absorbing upper section from the support tube.

The invention, as well as its many advantages, may be further understood by reference to the following detailed description and drawing which is a single FIGURE showing a longitudinal view, partly in section, of a preferred embodiment of the new steering column.

Referring to the FIGURE, the steering column includes an outer tube 10. The outer tube 10 has a longitudinal portion constructed to be energy absorbing. The energy absorbing longitudinal portion consists of convolutions 12 and convolutions 14 of lesser diameter connected to the convolutions 12. The convolutions separate the relatively non-energy absorbing lower section 16 of the tube 10 from the relatively non-energy absorbing upper section 18 of tube 10. In the preferred embodiment shown in the FIGURE, the upper section 18 of tube 10 includes an inner tubular portion 20 pressed against the outer tubular portion 22 in a manner similar to that described in U.S. Pat. No. 4,304,147. Of course, if desired other structures may be used in place of the two tubular portions 20 and 22 to provide the desired rigidity in that portion of the steering column.

In accordance with the invention, a support tube 24 is shown inserted within the outer tube 10. The support tube extends from the relatively non-energy absorbing lower section 16, through the convolutions 12 and 14 and into the relatively non-energy absorbing upper section 18. The support tube 24 includes a longitudinal portion 26 of lesser outside diameter and a longitudinal portion 28 of greater outside diameter interconnected by a tapering longitudinal portion 30.

When the support tube 24 is placed in the outer tube 10 the movement of the support tube 24 into the outer tube 10 is limited by the provision of a flared end 32 tube which abuts against the inside surface of the tapering portion 34 of the lower section 16. Tapering portion 34 interconnects the longitudinal portion 36 of greater diameter with the smaller diameter longitudinal portion 38, which in turn is connected to convolutions 12. The support tube 24 is press fit into the outer tube 10 with the longitudinal portion 28 and the flared portion 32 of support tube 24 tightly engaging longitudinal portion 38 and tapering portion 34, respectively, of the outer tube 10. The smaller diameter portion 26 and the tapering portion 30 of the support tube 24 are radially inwardly spaced from the convolutions 12 and 14 so that there is no contact between any part of the tube 24 and the convolutions 12 and 14.

To prevent metal-to-metal contact of the support tube 24 with the upper longitudinal section 18 of the tube 10, a noise dampener in the form of a plastic sleeve 40 separates the upper portion of the support tube 24 from the upper section 18 of the outer tube 10. Sleeve 40 has an annular portion 42 which extends radially inwardly over the extreme upper end of the support tube 24.

Since there is no contact between the convolutions and the support tube 24, the collapsing characteristics of the collapsible steering column are not changed.

The plastic sleeve 40 separates the support tube 24 from the upper section 18 of the outer tube 10 so that any vibrations or noise due to metal-to-metal contact are eliminated. Though sleeve 40 is preferably made of plastic, it may be made of any other suitable noise dampening material, such as rubber.

The force due to any accident causing impact of the driver against the steering wheel will be from right to left looking at the FIGURE. Therefore, this force will be absorbed by the convolutions and cause the collapse of the convolutions 12 and 14. There will be very little force, if any, tending to cause vibrations in lower section 16 below the convolutions 12. Therefore, there is no need to separate the longitudinal portions 28 and flared end 32 of the support tube 24 from the longitudinal portion 38 and tapering portion 34, respectively, of the lower section 16 of tube 10 by a noise dampener.

I claim:

1. A steering column for a steering wheel assembly for a motor vehicle comprising:

a rotatable outer tube having energy absorbing means along a longitudinal portion thereof separating relatively non-energy absorbing upper and lower sections;

a support tube within the outer tube and rotatable with the outer tube, the support tube extending from the lower relatively non-energy absorbing section into the relatively non-energy absorbing upper section, the support tube contacting the relatively non-energy absorbing lower section with the longitudinal part of the support tube adjacent the energy absorbing means being radially spaced from the energy absorbing means; and an annular noise dampener separating the relatively non-energy absorbing upper section from the support tube.

2. A steering column for a steering wheel assembly for a motor vehicle in accordance with claim 1 wherein: the part of the support tube contacting the relatively non-energy absorbing lower section is a longitudinal part of the support tube press fit into the outer tube.

3. A steering column for a steering wheel assembly for a motor vehicle in accordance with claim 2 wherein: the annular noise dampener is a plastic sleeve.

4. A steering column for a steering wheel assembly for a motor vehicle in accordance with claim 3 wherein: the energy absorbing means are convolutions is radially spaced from the convolutions.

* * * * *